Sept. 11, 1951     E. A. SCHULE     2,567,530
TRAILER HITCH

Filed Oct. 29, 1949     2 Sheets-Sheet 1

INVENTOR
E. A. SCHULE
BY
Richard P. Cardew
AGENT

Sept. 11, 1951 E. A. SCHULE 2,567,530
TRAILER HITCH
Filed Oct. 29, 1949 2 Sheets-Sheet 2
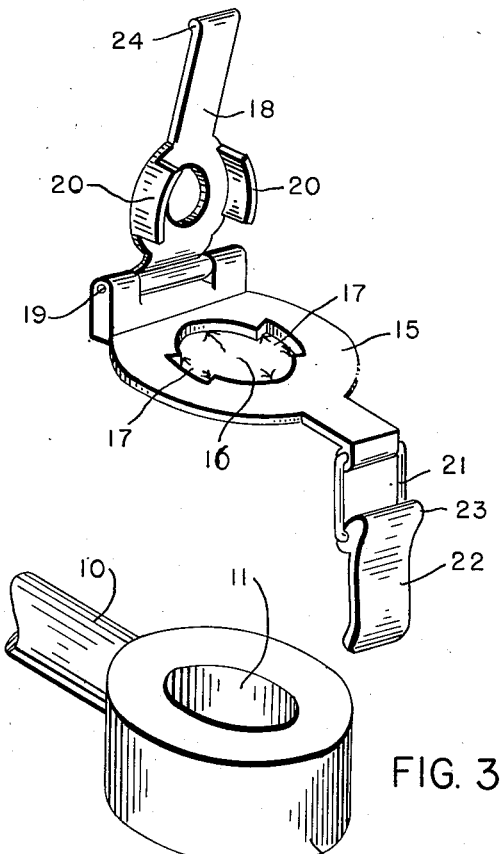
FIG. 3
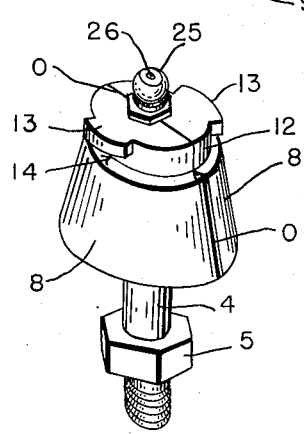
INVENTOR
E. A. SCHULE
BY
Richard P. Cardew
AGENT Patented Sept. 11, 1951

2,567,530

UNITED STATES PATENT OFFICE 2,567,530

TRAILER HITCH

Earl A. Schule, Deer River, Minn., assignor of one-half to Eugene S. Morris, Houston, Tex.

Application October 29, 1949, Serial No. 124,320

5 Claims. (Cl. 280—33.17)

This invention relates to trailer hitches and has special reference to a hitch for coupling an automobile and trailer.

It is well known that trailer hitches that are now on the market are not too satisfactory. While many of these devices employ ball and socket connections to provide free pivoting of the connection, they do not provide a positive lock for the trailer to the car. Many times trailers become uncoupled from the towing car due to vibration, etc.

It is one of my principal objects to provide a trailer hitch with locking means whereby one will be sure that his trailer will not become uncoupled.

Another object is to provide a trailer hitch with a ball and socket joint that will insure free and smooth pivotal action and an improved attaching means for the tongue of a trailer on the hitch which will be strong, yet pivotal, and which may be locked in place to prevent accidental uncoupling of the trailer from the hitch.

These and other objects and advantages will become more apparent as the description of the invention proceeds.

In the accompanying drawing forming a part of this application:

Fig. 3 is an exploded view of the parts of my hitch device to illustrate the assembly thereof.

Figure 1:
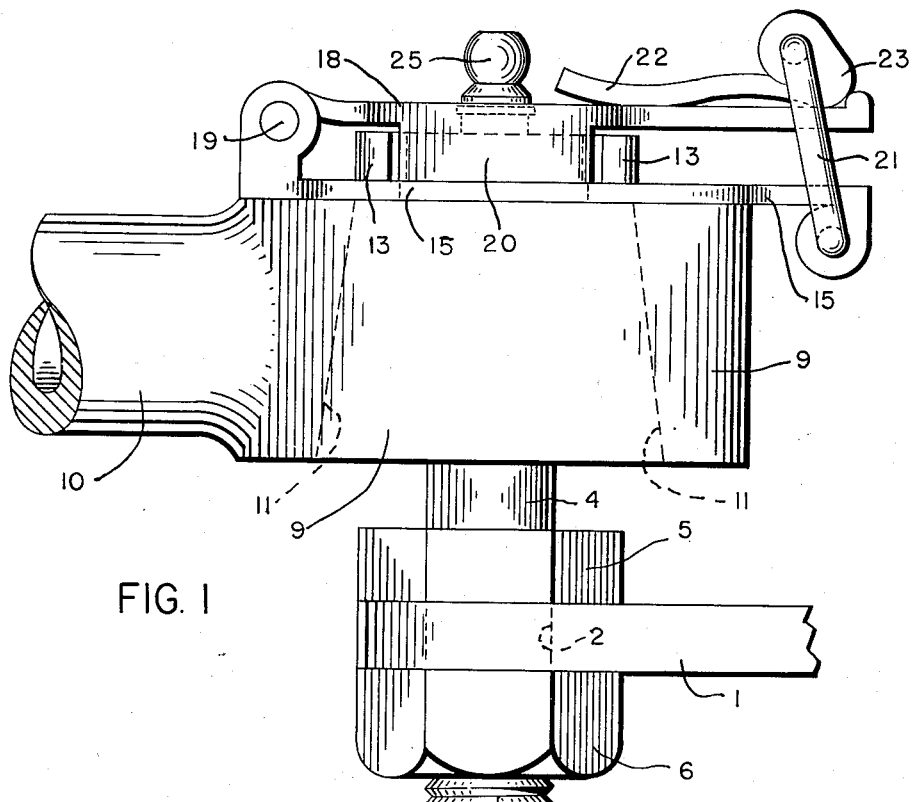
Fig. 1 is a side elevational view of my improved hitch connection.
Figure 2:
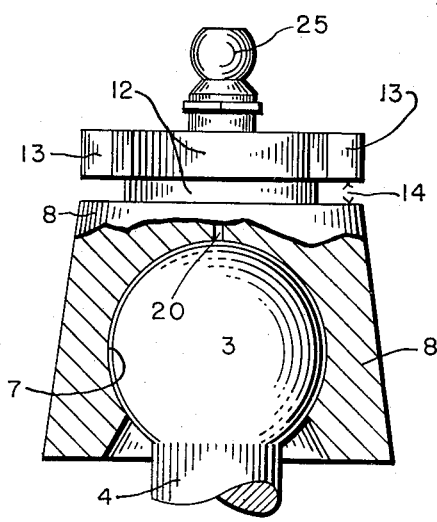
Fig. 2 is an elevational view, partly in section of the ball and socket portion of my hitch.

In the drawing, the reference numeral 1 indicates a common metal tongue-like member which is carried on an automobile to receive a trailer hitch ball, or the like. The member 1 is, of course, provided with an opening, indicated at 2, to receive a bolt or stem of a hitch connection, all of which is common in the art.

My hitch comprises a ball 3 having a threaded stem 4 thereon, the stem being provided with a collar or flange 5, to provide a stop for installing the ball on the member 1 with a nut 6 on the end of the stem, as shown, it being deemed apparent that the collar or flange 5 may be of any suitable design.

The socket 7 for the ball 3 is preferably made in two halves 8—8 which form the socket member of the hitch, the halves being welded together along the separation line 0 after the ball is in place whereby a permanent mounting of the ball is provided. The outer surface of the socket member 8—8 is circular and frusto-conical in shape with the smaller portion at the upper end thereof, as shown, whereby the ring 9, which is carried on the tongue 10 of the trailer, may be installed on the socket portion by placing it over the latter. The ring 9 is provided with a circular opening 11 which is tapered to correspond with, and form a firm pivotal connection on, the tapered sides of the socket portion.

In order to secure the ring 9 on the socket member 8—8 and prevent its becoming uncoupled accidentally, I provide a hub 12 on the upper end of the socket member preferable axially thereof, the hub having opposed laterally projecting lugs 13—13 adjacent the upper end thereof, the lugs being spaced from the upper surface of the socket member 8—8 to provide grooves 14—14, the inner extremities of which are concentric with the adjacent portions of the hub.

A locking device is provided to coact with the hub and lugs to lock the ring 9 firmly in place on the socket member. The locking device consists of a flat member or locking ring 15 having an opening 16 therein to fit the hub, the opening having opposed cut-out portions or notches 17 whereby the member 15 may be installed on the hub 12, the cut-out portions receiving the lugs 13 so the member 15 may be rotated on the hub 12 below the lugs.

A clamping lever 18 is pivotally carried adjacent and above one edge of the member or ring 15, as at 19, so that the lever may be carried in substantially parallel, spaced relation to the member 15 as shown, above the hub 12. A pair of opposed fingers 20 project or extend downwardly from the lever 18, the fingers being so placed and arranged as to extend between the lugs 13 on the hub 12 and adjacent the hub, as shown, when the lever is in normal position above and substantially parallel with the member 15 on the hub.

When assembling the locking device on the hub 12 to secure the ring 9 in place, the member 15 is placed on the hub, the lugs 13, of course, passing through the cut-away portions 17. The member 15 is then rotated substantially a quarter turn so that the cut-away portions 17 are located opposite the open portion of the hub. This prevents the member 15 from being removed from the hub until it is turned back so that the cutouts 17 register with the lugs 13, obviously. With the member 15 installed as above, the lever 18 is swung into place above the member 15 so that the fingers overlap the hub on each side of the lugs 13 and extend into the cut-out portions 17. This prevents the member 15 from being turned on the hub as the fingers 20 engage the lugs 13, and are also engaged in the cut-out portions 17.

The lever 18 is held in place by means of a snap lock fastening device which comprises a loop 21 pivotally carried on the member 15 opposite the pivotal installation of the lever 18, and a locking lever 22 carried on the loop 21. The lever 22 has an off-set portion 23 and the lever 18 has a ridge 24 which coact to clamp the lever 18 securely in position, as clearly shown in Fig. 1, with the portion 23 resting in off-center relation to the loop 21 to prevent the lever 18 from coming unhooked accidentally.

As shown in the drawings, a grease fitting 25 may be provided on the upper end of the hub 12 and a passage 26 provided from the fitting to the ball socket. Thereby, the ball and socket connection may be kept lubricated for most efficient and durable service.

From the above it will readily be apparent that my trailer hitch provides many advantages over presently known devices. For example: there are no springs or bolts to fail or loosen; the socket for the ball is lubricated and encompasses almost the entire ball whereby dust can not work into the joint, wear is reduced to a minimum, and strength is increased; the ring 9 on the trailer tongue is very strong throughout and will stand the pulling stress no matter in what direction the stress is applied; and the tapered cone and corresponding socket in the ring 9 make it easy to line up the connection for coupling.

Having thus described my invention, what I claim is:

1. A trailer hitch for installation on a vehicle to receive the hitch connection from the tongue of a trailer comprising: a ball, means on said ball to secure same to a vehicle, a socket member pivotally carried on said ball, said socket member having an external contour to receive the hitch connection from a trailer tongue, said socket member having an upper end, a hub on said upper end, opposed lugs extending laterally from said hub, and a locking device detachably mounted on said hub, said locking device being adapted to overlap said hitch connection and engage said lugs to secure said hitch connection in place on said socket member.

2. In a trailer hitch for attachment to a vehicle to receive the hitch connection of a trailer, a ball, means to secure said ball to a vehicle, a socket member pivotally mounted on said ball, said socket member having an upper end, means on said socket member to receive the hitch connection of a trailer, a hub on said upper end, a lug extending laterally from said hub, a ring-like member rotatably carried on said hub below said lug whereby the latter acts as a stop to retain said ring-like member on said hub, said ring-like member having means to overlap said hitch connection, and means carried by said ring-like member to lock said trailer hitch connection on said socket member and lock said ring-like member from rotation on said hub, said ring-like member having a notched portion corresponding with said lug to permit its being removed from said hub to uncouple the trailer hitch connection from said socket member.

3. The structure as set forth in claim 2 and said locking means comprising a locking lever carried in spaced substantially parallel relation to said ring-like member, said lever having a finger projecting downwardly therefrom adjacent said hub and engaged within the notched portion of said ring-like member, said lug preventing the rotation of said ring-like member on said hub by engaging said finger.

4. Means to lock a ring carried at the end of a trailer tongue on a socket member of a vehicle trailer hitch, said socket member having an upper end, comprising: a hub on the upper end of said socket member, a ring-like member detachably mounted on said hub and adapted to overlap said ring, and means to secure said ring-like member on said hub comprising a locking lever carried in spaced substantially parallel relation to said ring-like member over said hub, a lug extending laterally from said hub intermediate said ring-like member and said lever to prevent the removal of said ring-like member from said hub, said ring-like member having a notched portion which will correspond with said lug when said ring-like member is rotated to a predetermined position for removal from said hub, a finger projecting downwardly from said lever and engaging said lug to prevent the rotation of said ring-like member to said predetermined position, and means to secure said lever and ring-like member together in their normal spaced relation.

5. Means to lock a ring carried at the end of a trailer tongue on a socket member of a vehicle trailer hitch having an upper end comprising: a hub on the upper end of said socket member, a ring-like member carried on said hub and over-lapping said ring, means to secure said ring-like member on said hub, a lug extending laterally from said hub above said ring-like member to prevent the removal of the latter from said hub, said ring-like member having a notched portion to permit its removal from said hub when in a predetermined position, a locking lever carried above and in spaced substantially parallel relation to said ring-like member, said lever having a finger projecting downwardly therefrom adjacent said hub and engaged within the notched portion of said ring-like member, said lug preventing the rotation of said ring-like member on said hub by engaging said finger, and means to secure said lever and ring-like member together.

EARL A. SCHULE.

REFERENCES CITED

The following references are of record in the file of this patent:

UNITED STATES PATENTS

| Number | Name | Date |
| --- | --- | --- |
| 1,327,265 | Booth | Jan. 6, 1920 |
| 2,150,010 | Solomon | Mar. 7, 1939 |
| 2,267,969 | Bennett | Dec. 30, 1941 |
| 2,438,749 | Harrer | Mar. 30, 1948 |
| 2,458,209 | Sawatzki | Jan. 4, 1949 |

FOREIGN PATENTS

| Number | Country | Date |
| --- | --- | --- |
| 460,462 | Great Britain | Jan. 28, 1937 |
| 681,616 | France | May 16, 1930 |